(12) United States Patent
Ohbi et al.

(10) Patent No.: US 7,736,712 B2
(45) Date of Patent: Jun. 15, 2010

(54) SEAL MATERIAL FOR A DISPENSING APPARATUS

(75) Inventors: Daljit S Ohbi, Norfolk (GB); Sally Beken, Norfolk (GB)

(73) Assignee: Consort Medical PLC, Hertfordshire (GB)

( * ) Notice: Subject to any disclaimer, the term of this patent is extended or adjusted under 35 U.S.C. 154(b) by 341 days.

(21) Appl. No.: 10/507,214

(22) PCT Filed: Mar. 18, 2003

(86) PCT No.: PCT/GB03/01123

§ 371 (c)(1),
(2), (4) Date: Sep. 16, 2004

(87) PCT Pub. No.: WO03/078538

PCT Pub. Date: Sep. 25, 2003

(65) Prior Publication Data

US 2005/0241636 A1    Nov. 3, 2005

(30) Foreign Application Priority Data

Mar. 18, 2002  (GB) .............................. 0206354.3
Feb. 14, 2003  (GB) .............................. 0303451.9

(51) Int. Cl.
  A61M 11/00  (2006.01)
  A61M 11/02  (2006.01)
  B29D 22/00  (2006.01)
  B29D 23/00  (2006.01)

(52) U.S. Cl. ............ 428/35.7; 128/200.14; 128/200.23; 215/200; 215/247; 222/645; 424/43; 424/45; 428/34.1; 525/95; 525/331.1; 525/352

(58) Field of Classification Search ................ 428/35.7, 428/34.1; 525/95, 352, 331.1; 424/47, 43, 424/45; 222/645; 128/200.14, 200.23; 215/200, 215/247

See application file for complete search history.

(56) References Cited

U.S. PATENT DOCUMENTS

| | | | | |
|---|---|---|---|---|
| 1,634,924 A | * | 7/1927 | Whitby | .................... 525/332.7 |
| 3,443,006 A | * | 5/1969 | Gribens et. al. | ............. 264/249 |
| 4,695,609 A | * | 9/1987 | Stevenson | .................... 525/352 |
| 5,276,094 A | * | 1/1994 | Kaszas et al. | .................. 525/95 |
| 5,370,862 A | * | 12/1994 | Klokkers-Bethke et al. | ... 424/47 |
| 6,092,696 A | | 7/2000 | Thomas | |
| 6,300,421 B1 | * | 10/2001 | Blok et al. | ................ 525/331.1 |

FOREIGN PATENT DOCUMENTS

EP    0 597 362 A    5/1994

(Continued)

OTHER PUBLICATIONS

The Patents & Designs Journal, May 2, 2001, The Patent Office (United Kingdom), No. 5842, p. 1680.*

*Primary Examiner*—Brent T O'Hern
(74) *Attorney, Agent, or Firm*—Bacon & Thomas, PLLC (57) ABSTRACT

A seal for a valve for use in a pharmaceutical dispensing device, which seal is formed from an elastomeric composition comprising:
  (a) an isobutylene polymer or co-polymer thereof;
  (b) a cross-linking agent for the isobutylene polymer or co-polymer thereof; and
  (c)) an accelerator for the cross-linking agent, wherein the accelerator includes a polysulphide compound derived from a substituted dithiocarbonic acid or derivative thereof.

31 Claims, 5 Drawing Sheets

FOREIGN PATENT DOCUMENTS

| | | | |
|---|---|---|---|
| EP | 0 866 096 A | | 9/1998 |
| GB | 1 201 918 | | 8/1970 |
| GB | 0106046.6 | * | 3/2001 |
| JP | 52 127953 A | | 10/1977 |
| JP | 55 029547 A | | 3/1980 |
| JP | 58 087139 A | | 5/1983 |
| JP | 10 060172 A | | 8/1996 |
| WO | 97/01611 | | 1/1997 |
| WO | WO 02072449 A1 | * | 9/2002 |

* cited by examiner

FIG. 1.
NEOPRENE AGEING AT 110°C % E.B

FIG. 2.
NEOPRENE AGEING @ 150 DEG. C - % ELONGATION

FIG. 4.

BUTYL EF150 AGEING @ 150 DEG. C - % ELONGATION
BATCH 4208724

FIG. 5.

BUTYL EF150 AGEING AT 140°C % E.B
BATCH 4208724

FIG. 6.

BUTYL EF 150 AGEING 130°C % E.B
BATCH 4208724

FIG. 7.

BUTYL EF 150 AGEING PROFILE TIME TO 50%
OF ORIGINAL ELONG. @ BREAK BATCH 4208724

FIG. 8.

SEAL MATERIAL FOR A DISPENSING APPARATUS

The present invention relates to a seal material and, in particular, to an elastomeric seal material which may be used in a dispensing apparatus for dispensing pressurised fluid in the form of an aerosol. Such an apparatus may be used for dispensing medicine or products in solution or suspension in an alcohol base.

It is known from GB-1201918 to provide a dispensing apparatus in which pressurised fluid from a pressurised dispensing container is released by a valve in a substantially controlled manner, the valve including elastomeric seals which are annular and which co-operate with a sliding valve stem to open and close fluid ports.

Known rubber compounds for sealing pharmaceutical metered dose aerosol inhalers are based on the traditional technology of vulcanising a synthetic or natural rubber polymer.

The required material properties necessary for good seal performance for pharmaceutical applications include: chemical compatibility (swell), tensile strength, permanent compression set, stress relaxation, elastic modulus, regulatory compliance, low extractives (i.e. cleaner materials), and stable properties after extraction.

Products to be dispensed are commonly provided in solution or suspension in an alcohol base, this being particularly common in the dispensing of medicinal compounds for inhalation therapy.

A typical apparatus includes a CFC volatile propellant having a liquid phase in which the product together with the alcohol carrier is readily soluble within the container. A typical material for the valve seal is a synthetic rubber such as nitrile rubber.

Recent trends in the production of aerosol dispensers have moved away from CFC propellants because of their environmental hazards and HFC propellants are now being introduced. A problem with such propellants is that alcohol is less soluble in the liquid phase of such propellants and tends to separate within the container, thereby exposing the valve seals to a much greater concentration of alcohol than was formerly the case. Seal materials such as nitrile rubber allow alcohol vapour to escape by permeation over extended storage periods so that the remaining quantity of alcohol is significantly depleted.

Accelerators are compounds which reduce the time required for curing/cross-linking of natural and synthetic rubbers. Accelerators may also act to improve the ageing characteristics and other physical properties of the rubber. Known accelerators include sulphenamides, guanidines, thioureas, thiazoles, dithiocarbamates (eg tellurium diethyldithio carbamate), thiuram sulphides (eg dipentamethylene thiuram hexasulphide and tetramethylthiuram disulphide), zinc oxide and tertiary amines.

The most important commercial cure accelerators are the mercaptobenzothiazole derivatives for example MBTS (dibenzthiazyle disulphide). As delayed-action primary accelerators, these derivatives provide good scorch protection, i.e. resistance to premature cross-linking, especially in polychloroprene rubbers.

Bromobutyl and butyl rubbers may be cured using a sulphur curing agent, together with MBTS and optionally thiuram (TMTD, tetramethyl thiuram disulphide). However, the combination of MBTS and TMTD can lead to the formation of nitrosamines which are undesirable in seals for pharmaceutical applications. The use of MBTS on its own can result in an MBT-type (2-mercaptobenzthiazole) residue as the by-product of the cross linking reaction. Such a residue is undesirable because it can leach out of the sealing material and migrate into the drug media. MBT also has a bitter taste.

Polychloroprene elastomers require accelerators for a practical cure reaction. A known accelerator is 2-mercaptoimidazoline (NA-22). However, there are concerns concerning the toxicity of this accelerator. In addition, this accelerator suffers from scorch, i.e. premature cross-linking. While MBTS and/or TMTD may be used in combination with NA-22 to alleviate such problems, there still exists the problem of undesirable by-product formation.

Peroxides such as dicumyl peroxide can also be used to cure polychloroprene. However, the curing reaction can be variable and this may affect the material properties; in extreme cases, the material can become brittle. Moreover the products of the reaction have to be removed as they can deteriorate Elastomer properties, for example ageing. Another problem is that peroxides are deactivated by antioxidants. Antioxidants are often required to enhance the ageing properties of the elastomer.

In most pharmaceutical applications it is also necessary to extract or wash the cured elastomer in order to remove surface residues and by-products resulting from the cure reaction and moulding process. The aforementioned conventional cure/accelerator systems require relatively lengthy extraction times (typically 50 to 70 hours). Prolonged extraction times have been found to result in a deterioration in material properties.

It is an object of the present invention to provide a seal material for a dispensing apparatus which addresses at least some of the problems associated with the prior art.

Accordingly, in a first aspect the present invention provides a seal for a valve for use in a pharmaceutical dispensing device, which seal is formed from an elastomeric composition comprising:
  (a) an isobutylene polymer or co-polymer thereof;
  (b) a cross-linking agent for the isobutylene polymer or co-polymer thereof; and
  (c) an accelerator for the cross-linking agent, wherein the accelerator includes a polysulphide compound derived from a substituted dithiocarbonic acid or derivative thereof.

The elastomeric composition preferably comprises one or more of polyisobutylene, polybutene, butyl rubber, halogenated butyl rubber, including derivatives thereof. More preferably, the elastomeric composition comprises butyl rubber or bromobutyl rubber. Butyl rubber is a copolymer made from isobutylene and a small amount of a diolefin such as, for example, isoprene (2-methylbuta-1,3-diene). Typically, butyl rubber comprises approximately 97% isobutylene and approximately 3% isoprene, and it may be polymerized using an aluminium chloride catalyst. Halogenated butyl rubbers such as bromobutyl rubber and chlorobutyl rubber may be made by treating isoprene-isobutylene rubber with bromine/chlorine.

It will be appreciated that the elastomeric composition may comprise a blend of an isobutylene polymer or co-polymer thereof with another polymer, such as a chlorine-substituted diene polymer. For example, a blend of butyl and polychloroprene may be used. Blending of polychloroprene with the non-polar butyl is advantageous as it allows dissipation of static charge. Static charge builds up during the automated valve assembly process and can cause seats to self adhere and pose problems in valve assembly.

In a second aspect the present invention provides a seal for a valve for use in a pharmaceutical dispensing device, which seal is formed from an elastomeric composition comprising:

(a) a chlorine-substituted diene polymer or co-polymer thereof;

(b) a cross-linking agent for the chlorine-substituted diene polymer or co-polymer thereof; and (c) an accelerator for the cross-linking agent, wherein the accelerator includes a polysulphide compound derived from a substituted dithiocarbonic acid or derivative thereof.

In the second aspect the elastomeric composition preferably comprises a chlorine-substituted butadiene polymer, more preferably 2-chlorobuta-1,3-diene (i.e. polychloroprene, also known as Neoprene). Again, it will be appreciated that the elastomeric composition may comprise a blend of a chlorine-substituted diene polymer or co-polymer thereof with another polymer. For example, a blend of butyl and polychloroprene may be used.

In both the first and second aspects the seal may be used in a valve for use in a pharmaceutical dispensing device, such as, for example, a nasal, pulmonary or transdermal delivery device. A preferred use of the seal is in a pharmaceutical metered dose aerosol inhaler device. The term pharmaceutical as used herein is intended to encompass any pharmaceutical, compound, composition, medicament, agent or product which can be delivered or administered to a human being or animal, for example pharmaceuticals, drugs, biological and medicinal products. Examples include antiallergics, analgesics, bronchodilators, antihistamines, therapeutic proteins and peptides, antitussives, anginal preparations, antibiotics, anti-inflammatory preparations, hormones, or sulfonamides, such as, for example, a vasoconstrictive amine, an enzyme, an alkaloid, or a steroid, including combinations of two or more thereof. In particular, examples include isoproterenol [alpha-(isopropylaminomethyl) protocatechuyl alcohol], phenylephrine, phenylpropanolamine, glucagon, adrenochrome, trypsin, epinephrine, ephedrine, narcotine, codeine, atropine, heparin, morphine, dihydromorphinone, ergotamine, scopolamine, methapyrilene, cyanocobalamin, terbutaline, rimiterol, salbutamol, flunisolide, colchicine, pirbuterol, beclomethasone, orciprenaline, fentanyl, and diamorphine, streptomycin, penicillin, procaine penicillin, tetracycline, chlorotetracycline and hydroxytetracycline, adrenocorticotropic hormone and adrenocortical hormones, such as cortisone, hydrocortisone, hydrocortisone acetate and prednisolone, insulin, cromolyn sodium, and mometasone, including combinations of two or more thereof.

The pharmaceutical may be used as either the free base or as one or more salts conventional in the art, such as, for example, acetate, benzenesulphonate, benzoate, bircarbonate, bitartrate, bromide, calcium edetate, camsylate, carbonate, chloride, citrate, dihydrochloride, edetate, edisylate, estolate, esylate, fumarate, fluceptate, gluconate, glutamate, glycollylarsanilate, hexylresorcinate, hydrobromide, hydrochloride, hydroxynaphthoate, iodide, isethionate, lactate, lactobionate, malate, maleate, mandelate, mesylate, methylbromide, methylnitrate, methylsulphate, mucate, napsylate, nitrate, pamoate, (embonate), pantothenate, phosphate, diphosphate, polygalacturonate, salicylate, stearate, subacetate, succinate, sulphate, tannate, tartrate, and triethiodide, including combinations of two or more thereof. Cationic salts may also be used, for example the alkali metals, e.g. Na and K, and ammonium salts and salts of amines known in the art to be pharmaceutically acceptable, for example glycine, ethylene diamine, choline, diethanolamine, triethanolamine, octadecylamine, diethylamine, triethylamine, 1-amino-2-propanol-amino-2-(hydroxymethyl)propane-1,3-diol, and 1-(3,4-dihydroxyphenyl)-2 isopropylaminoethanol.

The pharmaceutical will typically be one which is suitable for inhalation and may be provided in any suitable form for this purpose, for example as a powder or as a solution or suspension in a solvent or carrier liquid, for example ethanol.

The pharmaceutical may, for example, be one which is suitable for the treatment of asthma. Examples include salbutamol, beclomethasone, salmeterol, fluticasone, formoterol, terbutaline, sodium chromoglycate, budesonide and flunisolide, and physiologically acceptable salts (for example salbutamol sulphate, salmeterol xinafoate, fluticasone propionate, beclomethasone dipropionate, and terbutaline sulphate), solvates and esters, including combinations of two or more thereof. Individual isomers such as, for example, R-salbutamol, may also be used. As will be appreciated, the pharmaceutical may comprise of one or more active ingredients, an example of which is flutiform, and may optionally be provided together with a suitable carrier, for example a liquid carrier. One or more surfactants may be included if desired.

In both the first and second aspects the cross-linking agent (also known as a curing agent) provides or facilitates network formation to result in a three-dimensional polymer network structure. The cross-linking agent may act by reacting with the functional groups on the polymer chain. The cross-linking agent will typically comprise sulphur or a sulphur-containing compound. The cross-linking agent is preferably substantially free of any peroxide curing agents such as, for example, dicumyl peroxide.

In both the first and second aspects the polysulphide compound is preferably derived from a substituted xanthic acid or derivative thereof, preferably of the type ROC(S)SH, in which R is typically an alkyl radical. The substituted group in the polysulphide compound typically comprises an isopropyl group.

The polysulphide compound preferably comprises three or more bridging sulphur atoms, more preferably 3, 4 or 5 bridging sulphur atoms.

The polysulphide compound is preferably substantially free from nitrogen, phosphorus and metallic elements.

Advantageously, the polysulphide compound comprises or consists of diisopropyl xanthogen polysulphide.

In both the first and second aspects the elastomeric composition typically comprises up to 3 wt. % of the accelerator based on the total weight of the accelerator and polymer in the composition, more typically up to 1.5 wt. % of the accelerator based on the total weight of the accelerator and polymer in the composition, still more typically up to 1 wt. % of the accelerator based on the total weight of the accelerator and polymer.

In both the first and second aspects the weight ratio of the accelerator to the cross-linking agent in the elastomeric composition is preferably in the range of from 1:1 to 3:1, more preferably from 1:1 to 2:1.

In both the first and second aspects the seal advantageously further includes a filler, preferably a mineral filler. Mineral fillers are preferable to carbon black in order to minimise the formation of polynuclear aromatic hydrocarbon compounds. Suitable examples include any of magnesium silicate, aluminium silicate, silica, titanium oxide, zinc oxide, calcium carbonate, magnesium oxide magnesium carbonate, magnesium aluminium silicate, aluminium hydroxide, talc, kaolin and clay, including combinations of two or more thereof. Preferably, the filler is or comprises one or more of magnesium silicate, talc, calcined clay, kaolin and/or amino silane coated clay.

In both the first and second aspects the seal further preferably further includes a process aid, preferably a low molecular weight polyethylene.

In both the first and second aspects the seal may further comprise any of a reinforcement agent, a plasticizer, a binder, a stabilizer, a retarder, a bonding agents, an antioxidant, a lubricant, a pigment, a wax, a resin, an antiozonants, a secondary accelerator or an activator, including combinations of two or more thereof. Examples of antioxidants are 2:2'-methylene-bis(6-(1-methyl-cyclohexyl)-para-creosol) and octylated diphenylamine. An advantage of the seal according to the present invention is that it can be essentially free of an antioxidant if desired.

It will be appreciated that certain constituents may have more than one effect. For example, zinc oxide may act as an activator and as a filler. Similarly, magnesium oxide may act as an acid absorber and as a filler.

The term seal as used herein is intended to encompass any sealing member or portion thereof present in a pharmaceutical dispensing device, including, but not limited to, gaskets and seals whether static or dynamic.

The present invention also provides a valve for use in a pharmaceutical dispensing device and having a seal as herein described with reference to either the first or second aspect of the invention.

It will be appreciated that the seal may be provided as a separate component or may be formed integrally with the valve.

The present invention also provides a pharmaceutical dispensing device having a valve as herein described. The pharmaceutical dispensing device may be, for example, a nasal, pulmonary or transdermal delivery device. A preferred device is a pharmaceutical metered dose aerosol inhaler device.

The present invention also provides a dispensing apparatus for dispensing pressurised fluid comprising a valve body defining a chamber, a valve member extending movably through the chamber and through at least one annular seal co-operating with the valve member and the body to regulate the discharge of fluid, wherein the or at least one of the seals is as herein described with reference to either the first or second aspect of the invention.

Such a device may be used for dispensing medicine, pharmaceuticals, biological agents, drugs and/or products in solution or suspension as herein described.

In a preferred embodiment, the dispensing apparatus comprises a pressurised dispensing container having a valve body provided with two annular valve seals through which a valve member is axially slidable, the seals being disposed at inlet and outlet apertures of a valve chamber so that the valve functions as a metering valve.

The dispensing apparatus as herein described may comprise a pressurised dispensing container operatively connected to the valve body and containing the fluid to be dispensed and a hydrofluorocarbon propellant comprising propellant type 134a or 227. The designation of propellant types referred to in the present application is as specified in British Standard BS4580:1970 "Specification for number designations of organic refrigerants". Accordingly, propellant 134a is: 1,1,1,2-tetrafluoroethane $CH_2F$—$CF_3$ and propellant 227 is: 1,1,1,2,3,3,3 heptafluoropropane $CF_3$—$CHF$—$CF_3$.

The fluid to be dispensed typically comprises a liquid or particulate product as a solution or suspension in a carrier liquid. The carrier liquid preferably comprises an alcohol such as ethanol. One or more surfactants may be present.

The present invention provides particularly favourable results when used in conjunction with a hydrofluorocarbon propellant in the aerosol device.

The present invention also provides a seal for a valve for use in a pharmaceutical dispensing device, which seal comprises a vulcanisate of an isobutylene polymer or co-polymer thereof, a cross-linking agent for the isobutylene polymer or co-polymer thereof, and an accelerator for the cross-linking agent, wherein the accelerator includes a polysulphide compound derived from a substituted dithiocarbonic acid or derivative thereof.

The present invention also provides a seal for a valve for use in a pharmaceutical dispensing device, which seal comprises a vulcanisate of a chlorine-substituted diene polymer or co-polymer thereof, a cross-linking agent for the chlorine-substituted diene polymer or co-polymer thereof, and an accelerator for the cross-linking agent, wherein the accelerator includes a polysulphide compound derived from a substituted dithiocarbonic acid or derivative thereof.

In relation to the first aspect, the present invention also provides a process for the preparation of a seal for a valve for use in a pharmaceutical dispensing device, the process comprising:

(i) forming a composition comprising a mixture of an isobutylene polymer or co-polymer thereof, a cross-linking agent for the isobutylene polymer or co-polymer thereof, and an accelerator for the cross-linking agent, wherein the accelerator includes a polysulphide compound derived from a substituted dithiocarbonic acid or derivative thereof;

(ii) initiating a cross-linking reaction in the mixture to form a cross-linked elastomeric composition; and (iii) either before or after (ii) forming the composition into a seal.

In relation to the second aspect, the present invention also provides a process for the preparation of a seal for a valve for use in a pharmaceutical dispensing device, the process comprising:

(i) forming a composition comprising a mixture of a chlorine-substituted diene polymer or co-polymer thereof, a cross-linking agent for the chlorine-substituted diene polymer or co-polymer thereof, and an accelerator for the cross-linking agent, wherein the accelerator includes a polysulphide compound derived from a substituted dithiocarbonic acid or derivative thereof;

(ii) initiating a cross-linking reaction in the mixture to form a cross-linked elastomeric composition; and (iii) either before or after (ii) forming the composition into a seal.

In both of the above-described processes the step of forming the composition into a seal may involve one or more forming techniques such as compression moulding, injection moulding and/or extrusion.

The initiation of the cross-linking reaction may be achieved by any of the known conventional techniques, for example heating the formulation to at least the curing reaction temperature, which is typically in the range of from 130 to 200° C. A preferred process involves forming rubber compound strips (typically of approximately 1 mm thickness) by compression moulded. The moulding temperature is typically in the range 160°-180° C. The cure time is typically in the range 1-10 minutes. The moulded strips are preferably post cured in an air oven for typically 1 hour at 150° C.

The strips may then be made into gaskets (seats) using a punching device.

The thus formed rubber components may be washed using, for example, a detergent solution. This has been found, however, to have many disadvantages, particularly self adhering of components after the wash cycle, thereby making the valve assembly process difficult, and in extreme cases impossible. To address this the rubber components may alternatively (or in combination with a detergent wash) be immersed in an aqueous chlorinated solution such as, for example, a solution comprising water and bleach. Examples of bleach include sodium hypochlorite (NaOCl) and calcium hypochlorite (Ca(OCl)$_2$). Solutions of hypochlorous acid (HOCL) and/or hypochlorite solutions (i.e. an aqueous solution of a metallic salt of hypochlorous acid) may also be used. It is preferred that the aqueous chlorinated solution comprises water and hypochlorous acid. More preferably, it has been found that a dilute solution of a commonly used disinfectant in hospitals and clinical environments, sodium dichloroisocyanurate (NaDCC), gives substantially adhesion-free components and also advantages in the maintenance of drug solution stability. The process may be carried out using a commercial washing machine. The washed components are preferably then rinsed in water and then dried. The dried components are advantageously free from rubber debris.

This process has a surprising advantage over using a detergent in the wash cycle. In particular, it has been found that washing the components in a solution of NaDCC results in substantially adhesion-free components. Furthermore, there is always the possibility of non-rinsed detergent residue remaining on the seat surface after the wash cycle using conventional methods. Such residue can be carried over into the drug dispensing device. Drug formulations contain surfactants for achieving solution stability, which is important for the consistency of delivered dose, and detergent residues may interfere with stabilization mechanisms. Unstable drug formulation can also prevent device function by blockage of valve. The washing of components in NaDCC has yielded advantages in an automated valve assembly process and the prevention of contamination of drug mixtures by residual detergent.

The rubber components may optionally be ethanol extracted to reduce the level of leachable species that could migrate into drug mixtures. In this process, the components are loaded into a glass column and washed by refluxing ethanol.

The use of the accelerator as herein described in the elastomeric compositions according to the present invention can eliminate the need for free sulphur in the cross-linking process. The accelerator as herein described is preferably provided as a liquid and is preferably miscible with the polymer to provide a homogeneous dispersion. It has been found that the use of such an accelerator facilitates filler dispersion and can obviate the need for a separate plasticiser. The presence of plasticisers is undesirable in that they tend to leach out of the material. In contrast, the accelerator as herein described forms or is part of the cross-linked network and therefore does not leach out into the drug media.

In the seal compositions according to the present invention the accelerator is typically almost totally consumed during the cross-linking reaction. This results in a cleaner rubber and the extractables are reduced. Typically, substantially no nitrosamines are generated during the cross-linking reaction. Furthermore, the compositions according to the present invention show improved ageing characteristics compared with conventional Neoprene and Butyl rubber formulations. Most or substantially all of any by products resulting from the cross-linking reaction may be volatiles.

The present invention will now be further described with reference to the following non-limiting examples and drawings, provided by way of example, in which.

TABLE 1A

| Ingredients | Formulation | | | | |
|---|---|---|---|---|---|
| | EF147 | EF134 | EF150(14B) | EF151(14A) | EF149 |
| Bromobutyl | 0 | 0 | 100 | 100 | 100 |
| Polychloroprene | 100 | 100 | 0 | 0 | 0 |
| Clay | 40 | 40 | 40 | 40 | 30 |
| Silane treated Clay | 0 | 0 | 0 | 0 | 0 |
| Talc | 30 | 30 | 0 | 0 | 0 |
| Silica filler | 0 | 0 | 0 | 0 | 0 |
| Platey Talc | 0 | 0 | 80 | 80 | 80 |
| Stearic Acid | 1 | 1 | 1 | 1 | 1 |
| Octaamine | 0 | 1 | 0 | 0 | 0 |
| Antioxidant | 1 | 0 | 0 | 0 | 0 |
| Robac AS100 | 1 | 0 | 1 | 1 | 1.5 |
| MBTS | 0 | 0 | 0 | 0 | 0 |
| DPG | 0 | 0 | 0.5 | 0 | 0.5 |
| TBBS (PM 75%) | 0 | 0 | 0 | 1.33 | 0 |
| DOTG | 0.5 | 0 | 0 | 0 | 0 |
| Sulphur | 0.5 | 0 | 0.5 | 0.5 | 0.75 |
| Peroxide | 0 | 4 | 0 | 0 | 0 |
| Peroxide Coagent TAC | 0 | 0 | 0 | 0 | 0 |
| MgO | 4 | 4 | 0 | 0 | 0 |
| ZnO | 5 | 5 | 2 | 3 | 5 |
| Low MW PE | 0 | 0 | 1 | 2 | 2 |

TABLE 1B

| Ingredients | Formulation | | Formulation | | |
|---|---|---|---|---|---|
| | EF152 | EFMBTS | EF166 | EF168 | EF172 |
| Bromobutyl | 100 | 100 | 100 | 100 | 80 |
| Polychloroprene | 0 | 0 | 0 | 0 | 20 |
| Clay | 30 | 40 | 0 | 35 | 30 |
| Silane treated Clay | 0 | 0 | 80 | 0 | 0 |
| Talc | 0 | 0 | 35 | 0 | 80 |
| Silica filler | 0 | 0 | 5 | 5 | 0 |
| Platey Talc | 80 | 80 | 80 | 80 | 0 |
| Stearic Acid | 1 | 1 | 1 | 1 | 1 |
| Octaamine | 0 | 0 | 0 | 0 | 0 |
| Antioxidant | 0 | 0 | 0 | 0 | 0 |
| Robac AS100 | 2 | 0 | 1 | 0 | 1 |
| MBTS | 0 | 2 | 0 | 0 | 0 |
| DPG | 0 | 0 | 0.5 | 0 | 0.5 |
| TBBS (PM 75%) | 0 | 0 | 0 | 0 | 0 |
| DOTG | 0 | 0 | 0 | 0 | 0 |
| Sulphur | 0.75 | 0.5 | 0.5 | 0 | 0.5 |
| Peroxide | 0 | 0 | 0 | 0 | 0 |
| Peroxide Coagent TAC | 0 | 0 | 0 | 1 | 0 |
| MgO | 0 | 0 | 0 | 0 | 0 |
| ZnO | 5 | 2 | 3 | 2 | 2 |
| Low MW PE | 2 | 2 | 1 | 2 | 1 |

TABLE 2

| Ingredients | Formulation | | | | | | | | | |
|---|---|---|---|---|---|---|---|---|---|---|
| | EF125 | EF126 | EF127 | EF128 | EF129 | EF130 | EF131 | EF132 | EF133 | EF135 |
| Polychloroprene | 100 | 100 | 100 | 100 | 100 | 100 | 100 | 100 | 100 | 100 |
| Clay | 40 | 40 | 40 | 50 | 40 | 40 | 40 | 40 | 40 | 30 |
| Talc | 40 | 40 | 40 | 30 | 40 | 40 | 40 | 50 | 40 | 30 |
| Stearic Acid | 0 | 0 | 0 | 0 | 0 | 1 | 1 | 0 | 1 | 1 |
| Peroxide | 6 | 6 | 5.5 | 6 | 6 | 6 | 5 | 5 | 5 | 4 |
| MgO | 4 | 4 | 0 | 0 | 4 | 0 | 4 | 0 | 4 | 4 |
| ZnO | 5 | 5 | 5 | 5 | 5 | 5 | 5 | 5 | 5 | 5 |

Key
| | |
|---|---|
| EF147: | Neoprene with sulphur/diisopropyl xanthogen polysulphide cure system (invention) |
| EF125-EF135: | Neoprene with peroxide cure system (comparative) |
| EF150: (14B) | Bromobutyl rubber with sulphur/diisopropyl xanthogen polysulphide cure system (invention) |
| EF151: (14A) | Bromobutyl rubber with sulphur/diisopropyl xanthogen polysulphide cure system (invention) |
| EF149: | Bromobutyl rubber with sulphur/diisopropyl xanthogen polysulphide cure system (invention) |
| EF152: | Bromobutyl rubber with sulphur/diisopropyl xanthogen polysulphide cure system (invention) |
| EFMBTS: | Bromobutyl rubber with sulphur/MBTS cure system (comparative) |
| EF166: | Bromobutyl rubber with amino silane treated clay as a filler sulphur/diisopropyl xanthogen polysulphide cure system (invention) |
| EF168: | Bromobutyl rubber with peroxide cure system (comparative) |
| EF172: | Bromobutyl and polychloroprene rubber blend with sulphur/diisopropyl xanthogen polysulphide cure system (invention) |
| Bromobutyl: | Exxon 2246 |
| Polychloroprene: | Neoprene W |
| Clay: | Polestar 200R |
| Talc: | Magsil 2628 |
| Platey talc: | Mistron Vapour RP6D |
| Robac AS100: | A diisopropyl xanthogen polysulphide available from Robinson Brothers Ltd. |
| MBTS: | bis(2-benzothiazoyle disulphide) (rubber accelerator) |
| DPG: | diphenylguanidine (rubber accelerator) - Ekaland DPG Pd (Powder) |
| Silica: | Sipernet 2200 available from Degussa |

TABLE 2-continued

| | Formulation | | | | | | | | | |
|---|---|---|---|---|---|---|---|---|---|---|
| Ingredients | EF125 | EF126 | EF127 | EF128 | EF129 | EF130 | EF131 | EF132 | EF133 | EF135 |
| TAC: | Alcapudre 70, Triallyl Cyanurate, available from Akzo Nobel | | | | | | | | | |
| Silane treated clay: | Clay with amino silane treatment | | | | | | | | | |
| TBBS: | N-tertiary butyl 2 benzothiazoyle sulfonamide Robac TBBS (75% active polymer masterbatch) | | | | | | | | | |
| DOTG: | di-o-tolylguanidine (rubber accelerator) - Ekaland DOTG Pd (Powder) | | | | | | | | | |
| Sulphur: | AKM 300# GSS 2.5% (magnesium coated sulphur) | | | | | | | | | |
| Peroxide: | 40% di(2-tert-butylperoxyisopropyl-2-benzene, bis peroxide) - Luperco/Peroximon/Perkadox | | | | | | | | | |
| Magnesium Oxide: | Maglite Y or DE | | | | | | | | | |
| Low MW PE: | PE AC617A or Luwax | | | | | | | | | |

The rubber formulations were mixed using a Francis Shaw 1.21 laboratory Banbury Mixer using speed setting 1 (long rotor speed 117 rpm), a friction ratio 1:1.125, and cooling waters circulated through the body, jacket and rotors. Mixing quality and consistency may be controlled by the time of mixing and the temperature of mixing and the energy used.

Rubber compound strips of approximately 1 mm thickness were compression moulded using a press with electrically heated platens. The moulding temperature was in the range 160°-180° C. The cure time was determined from rheometer traces and was in the range 1-10 minutes. The moulded strips were post cured in an air oven for 1 hour at 150° C.

The strips were made into gaskets (seats) using a punching device.

The seats were washed initially using a detergent solution. This was found to have many disadvantages such as self adhering of components after the wash cycle, making the valve assembly process difficult, and in extreme cases impossible. It was found that a dilute solution of a commonly used disinfectant in hospitals and clinical environments, Sodium dichloroisocyanurate (NaDCC), gave essentially adhesion-free components and also advantages in the maintenance of drug solution stability. The process was carried out using a commercial washing machine. The machine was loaded with about 1 kg of seats contained in a textile mesh bag. 9 tablets of NaDCC (2.5 g weight) were dissolved in 1 liter of tap water. The solution was added to the machine's water inlet, and a further 30 litres of hot water at 30° C. was introduced. The components were washed for 20 minute after which the water was discharged. The components were then rinsed using 30 liters of tap water at 30° C. for about 10 minutes and the water discharged. The components were tumble dried for about 30 minutes.

The dried components were free from rubber debris.

This process has a surprising advantage over using a detergent in the wash cycle. The components do not adhere to each other and are thus easily assembled in to valves.

There is always the possibility of non-rinsed detergent residue remaining on the seat surface after the wash cycle. This can be carried over into the drug dispensing device. Drug formulations contain surfactants for achieving solution stability, which is important for the consistency of delivered dose, and detergent residues can also interfere with stabilization mechanisms. Unstable drug formulation can also prevent device function by blockage of valve.

The NaDCC washing of components has yielded advantages in an automated valve assembly process and the prevention of contamination of drug mixtures by residual detergent.

The rubber components may optionally be ethanol extracted to reduce the level of leachable species that could migrate into drug mixtures. In this process, the components are loaded into a glass column and washed by refluxing ethanol.

TABLE 3A

| Acetone extracts | EF147 <2% | EF134 4.2% | EF150 14B <2% | EF151 14A <2% |
|---|---|---|---|---|
| HPLC | No DOTG above limit of 0.005% | Will be peroxide residues by GC-MS | No DPG above limit of 0.005% | MBT detected at 0.007% |
| GC-MS on acetone extracts | N/a | N/a | 4 ppm of DPG residue | N/a |
| HPLC | N/a | N/a | N/a | N/a |
| nitrosamine ppb | N/a | N/a | N/a | N/a |
| nitrosamine ppb | N/a | N/a | None detected | 1 |
| Comparative Sealing (ambient) Propellant 134a loss | N/a | N/a | 3 mg in 14 days | N/a |
| Sealing (ambient) Propellant 134a loss | 10-14 mg in 6 months | N/a | 2-11 mg in 3 months | N/a |
| Sealing (40° C./75% RH)) Propellant 134a loss | 69-94 mg in 6 months | N/a | 6-30 mg in 3 months | N/a |
| USP<87> In vitro Toxicology rating (ethanol extracted samples) | 1 | N/a | 0 | N/a |
| USP<87> In vitro Toxicology rating (non ethanol extracted samples) | N/a | N/a | 1 | N/a |

TABLE 3B

| Acetone extracts | Black nitrile 8.5-10% | EFMBTS 3% | EF166 1.35% | EF172 N/a |
|---|---|---|---|---|
| HPLC | N/a | N/a | N/a | N/a |
| GC-MS on acetone extracts | N/a | MBTS residues detected at various levels 32, 59, 91 ppm | No DPG residue | N/a |
| HPLC | MBT, ZDMC detected at various levels | N/a | N/a | N/a |
| nitrosamine ppb | Various levels 17, 83 | N/a | N/a | N/a |
| nitrosamine ppb | N/a | N/a | N/a | N/a |
| Comparative Sealing (ambient) Propellant 134a loss | N/a | 2 mg in 14 days | 2 mg in 14 days | N/a |
| Sealing (ambient) Propellant 134a loss | N/a | N/a | N/a | N/a |
| Sealing (40° C./75% RH) Propellant 134a loss | N/a | N/a | N/a | N/a |
| USP<87> In vitro Toxicology rating (ethanol extracted samples) | N/a | N/a | 0 | 1 |
| USP<87> In vitro Toxicology rating (non ethanol extracted samples) | N/a | N/a | N/a | N/a |

TABLE 4

| Formulation | Cure Temp | T90 Time to 90% cure min-secs | Hardness | Tensile Strength (MPa) | % EB |
|---|---|---|---|---|---|
| EF134 | 170° C. | 8.98 | 75 | 7 | 273 |
| EF147 | 170° C. | 9.91 | 75 | 12 | 390 |
| EF149 | 170° C. | 4.05 | 60 | 5.6 | 430 |
| EF150 | 170° C. | 3.8 | 58 | 6.1 | 690 |
| EFMBTS | 170° C. | 8.1 | 54 | 6.5 | 580 |
| EF 151 | 170° C. | 4.6 | 56 | 6.7 | 520 |
| EF152 | 170° C. | 2.04 | 58 | 6.5 | 390 |
| EF 166 | 170° C. | 4.93 | 57 | 6.1 | 490 |
| EF168 | 170° C. | 3.54 | 47 | 4.9 | 740 |
| EF 172 | 170° C. | 4.74 | 60 | 5.9 | 600 |

Discussion

Figure 8:
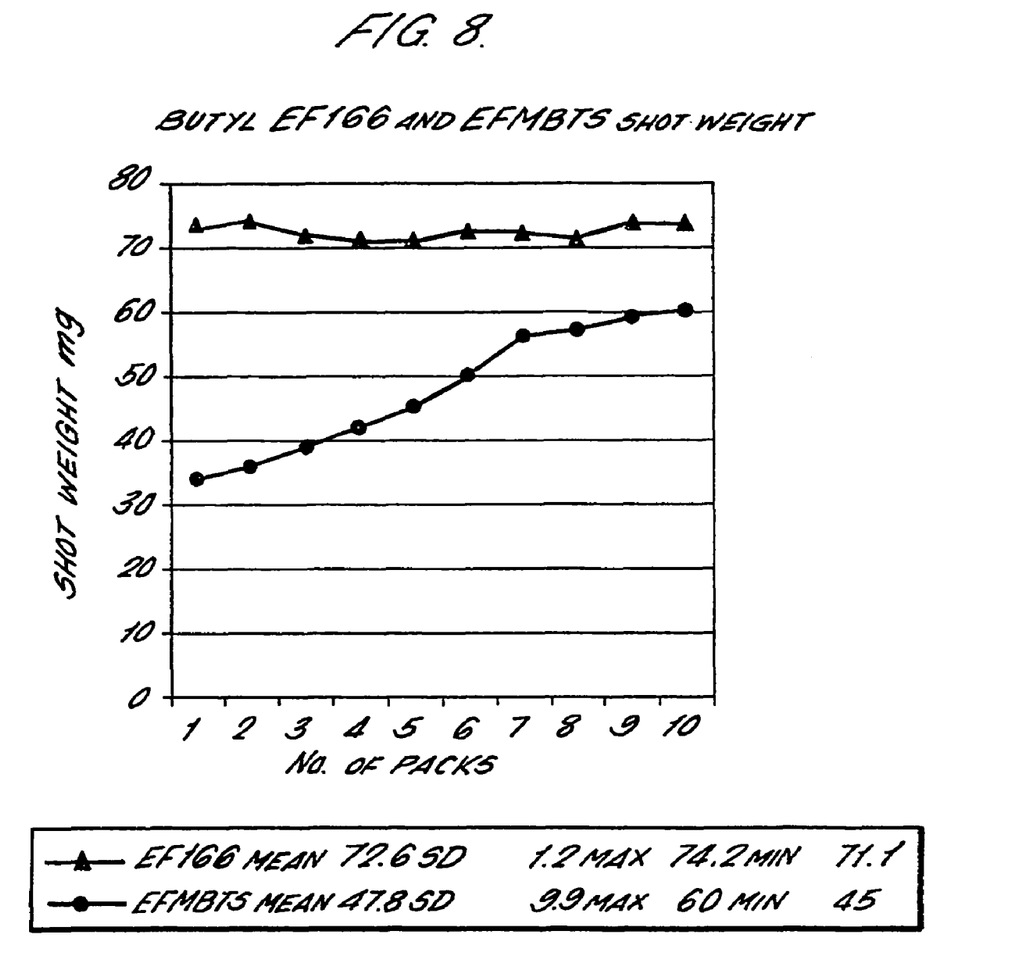
FIG. 8 is a plot of shot weight against No. of packs for Example EF166 (a bromobutyl formulation according to the present invention) and EFMBTS (a Comparative Example).

1. With reference to Tables 3A and 3B, the acetone extracts in respect of the formulations according to the invention are lower than black nitrile.
2. With reference to formulations EF147, EF150 and EF151, the Robac AS100 concentration is so small that it is not detected by HPLC. The accelerator is therefore almost totally consumed during the cross-linking reaction with the corollary of a cleaner rubber.
3. With reference to formulations EF150, EF166, their acetone extract analysis by GC-MS shows that very low levels of DPG accelerator residues were detected. In contrast, there were significant levels of accelerator MBTS in EFMBTS. Hence Robac AS100 accelerated rubbers are cleaner.
4. The acetone extracts for the Butyl formulations containing Robac AS100 (i.e. EF150, EF151 and EF166) are approximately half those obtained for the non-Robac AS100 cured butyl material (i.e. EFMBTS). EF147 and EF134 are polychloroprene compositions differing only in the type of crosslinking system. EF147 has the Robac AS100 cure system and its acetone extract is half that for the peroxide cured EF134 formulation.
5. The use of Robac AS100 in Butyl, polychloroprene and their blends is also acceptable as non toxic rubbers are produced. According to the US Pharmacopoeia Commission, monograph USP<87> in vitro toxicology test, EF147, EF150 and EF166 have rating of 0, i.e. the rubbers are non toxic (see Tables 3A and 3B). Ethanol extracting of rubber components is not always necessary. EF154 non-extracted gave a USP<87> rating of 1 (non/slight toxic).
6. With reference to Table 4, the formulation EF152 gave a satisfactory rate of cure even in the absence of a secondary accelerator.
7. With reference to Table 4, the physical properties of the formulations according to the invention are not affected by the use of the Robac AS100 accelerator. Compared with MBTS, the EF152 formulation gave a shorter T90 time.
8. With reference to Table 4, the physical properties of the formulations according to the invention are not affected by the use of Robac AS100 accelerator when compared with equivalent formulations cured with peroxide. EF147 (Robac AS100) has equivalent physical properties to EF134 (peroxide cured) and has a comparable T90 time. Butyl formulations EF149, EF150, EF151, EF152 and EF166 also have a higher Tensile Strength than the equivalent peroxide cured butyl EF168 formulation.
9. With reference to Table 4, Butyl formulation EF166 includes amino silane coated clay as a filler. Silane coated fillers offer advantages in achieving good filler—rubber interactions, which can offer benefits in sealing and mechanical properties. The formulation is cured using Robac AS100.
10. EF172 is a blend of butyl and polychloroprene and is cured using Robac AS100. Blending of polychloroprene with the non-polar Butyl is advantageous as it allows dissipation of static charge. Static charge builds up during the automated valve assembly process and can cause seats to self adhere and pose problems in valve assembly. The blend cured with Robac AS100 has good physical properties (i.e. hardness, TS and % EB) that are comparable to the Butyl composition EF150. Its T90 cure time is also similar to EF150.
11. With reference to Tables 3A and 3B and the formulations according to the invention (i.e.EF147, EF149, EF150 and EF151, EF152, EF166, EF172), no nitrosamines were generated.
12. Sealing of rubber materials was investigated by filling MDI packs (having the sealing material) with 134a propellant/ethanol. The fill weights were 134a/Ethanol=18.0 g±0.2 g/0.95 g±0.02 g. The packs were stored in an inverted position at ambient and 40° C./75% RH. Before and after storage the packs were weighed to 3 decimal places to calculate the loss of propellant and hence the sealing capacity. From Tables 3A and 3B, a comparison of EF150, EF166 and EFMBTS shows that using Robac AS100 does not detract the good sealing properties of Butyl. Tables 3A and 3B also shows longer term sealing behavior of Robac AS100 cured rubbers. In all cases the leakage rates are very low.
13. PMDI devices must have consistent shot weights (dose) and the standard deviation (SD) of shots should be low. The shot weights of packs using EF166 and EFMBTS as sealing materials were determined. Packs were stored for 14 days in valve down position and the shot weights determined. FIG. 8 shows shot weights of test packs. Each pack was fired 10 times and the mean shot weight calculated. EF166 has a very consistent shot weight with a SD of 1.2. In comparison EFMBTS has an inconsistent shot weight and a SD of 9.9.

14. Butyl rubber cured with Robac AS100 has thus given an unexpected advantage, that is a very consistent shot weight. The reason why Butyl EFMBTS cured with a traditional dibenzthiazyl disulphide accelerator gave poor, unacceptable shot weights is not understood.

Figure 1:
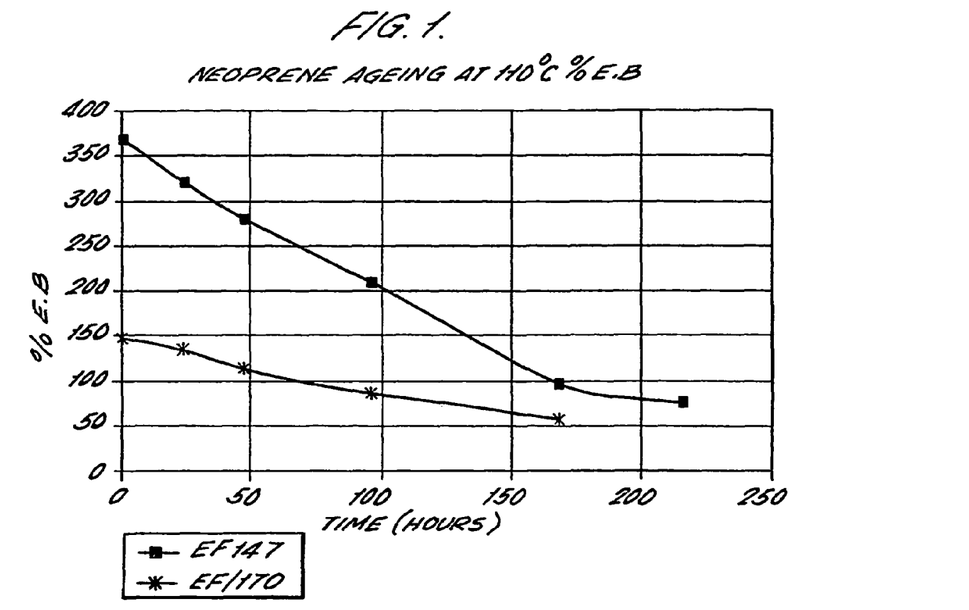
FIG. 1 is a plot of ageing at 110° C. for Example EF147 (a polychloroprene formulation according to the present invention) compared with a conventional polychloroprene (EF134)
Figure 2:
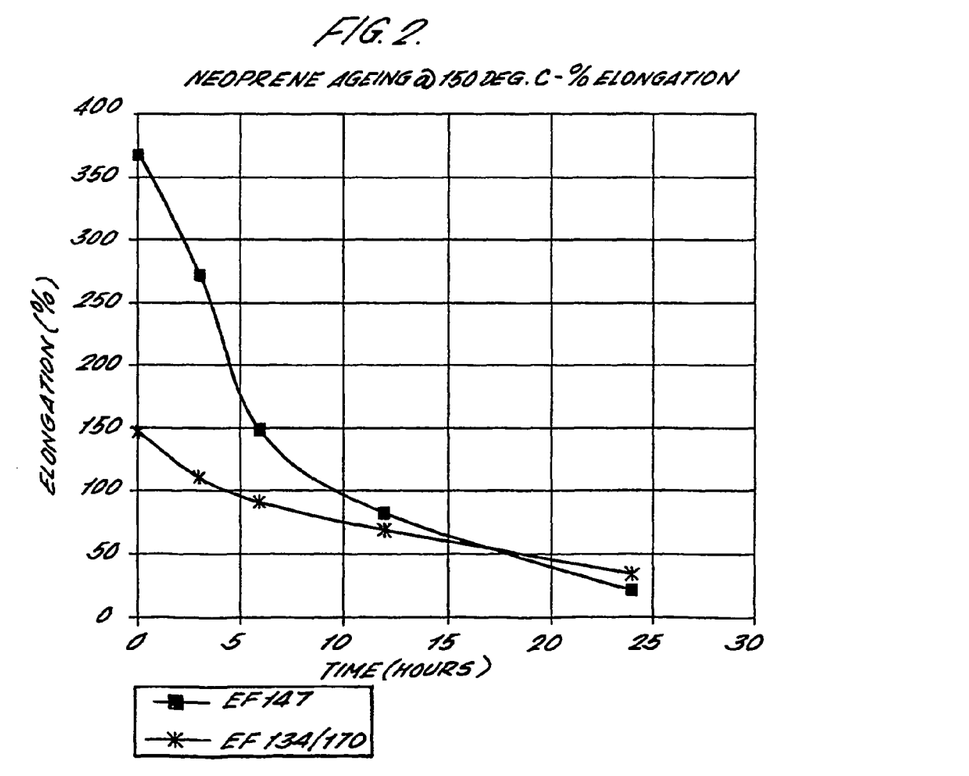
FIG. 2 is a plot of ageing at 150° C. for Example EF147 (a polychloroprene formulation according to the present invention) compared with a conventional polychloroprene (EF134)
Figure 3:
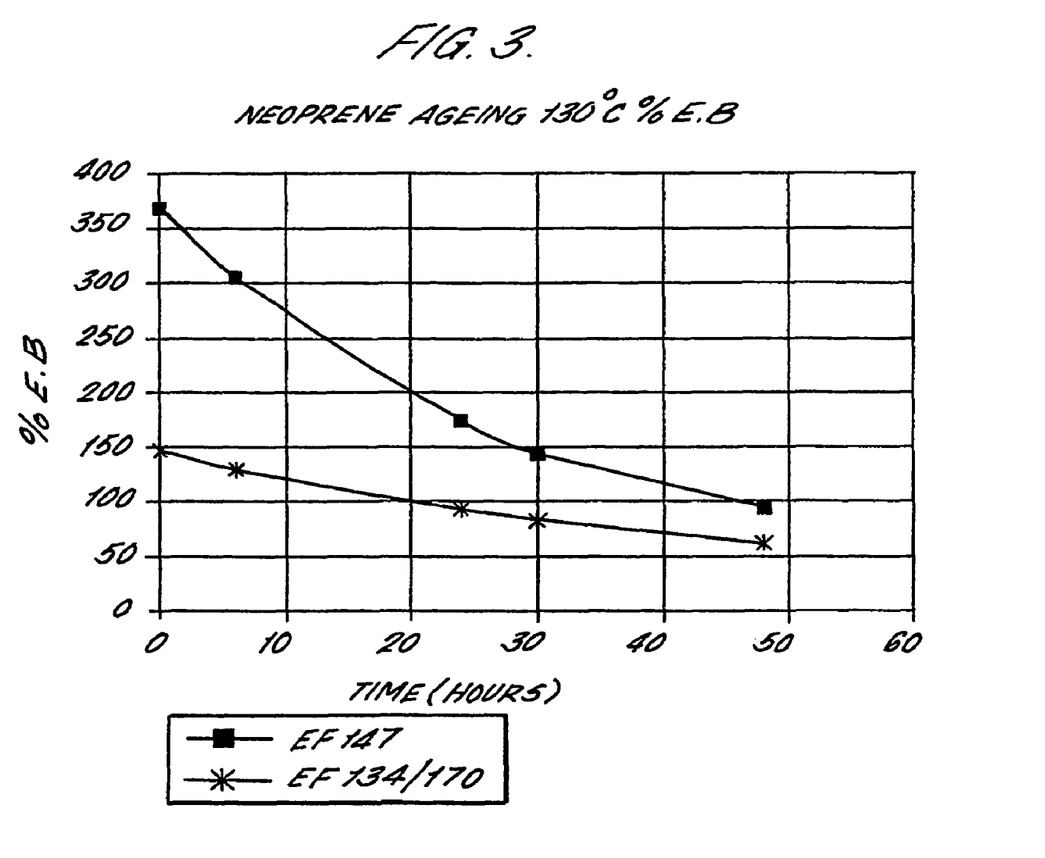
FIG. 3 is a plot of ageing at 130° C. for Example EF147 (a polychloroprene formulation according to the present invention) compared with a conventional polychloroprene.
Figure 4:
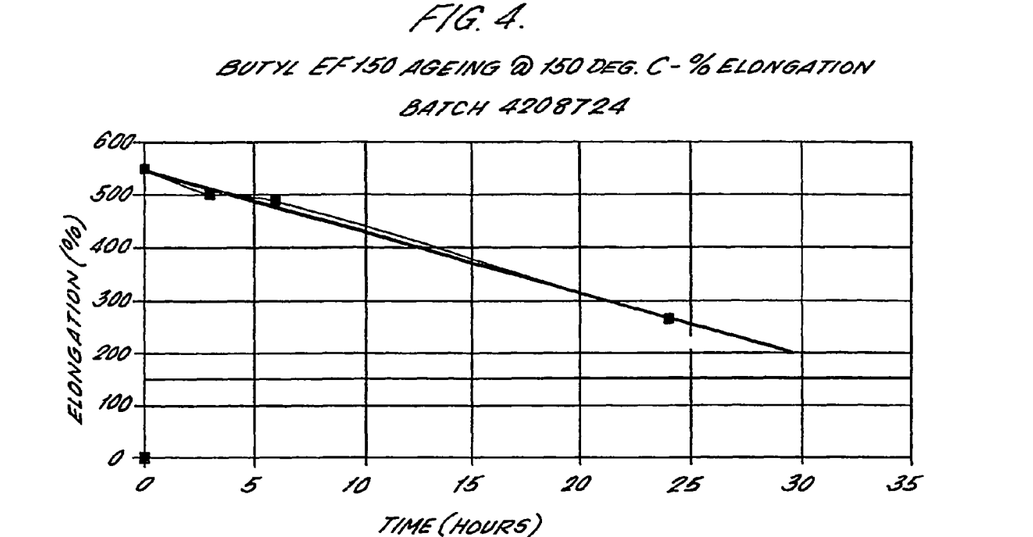
FIG. 4 is a plot of ageing (% Elongation against time) at 150° C. for Example EF150 (a bromobutyl formulation according to the present invention)
Figure 5:
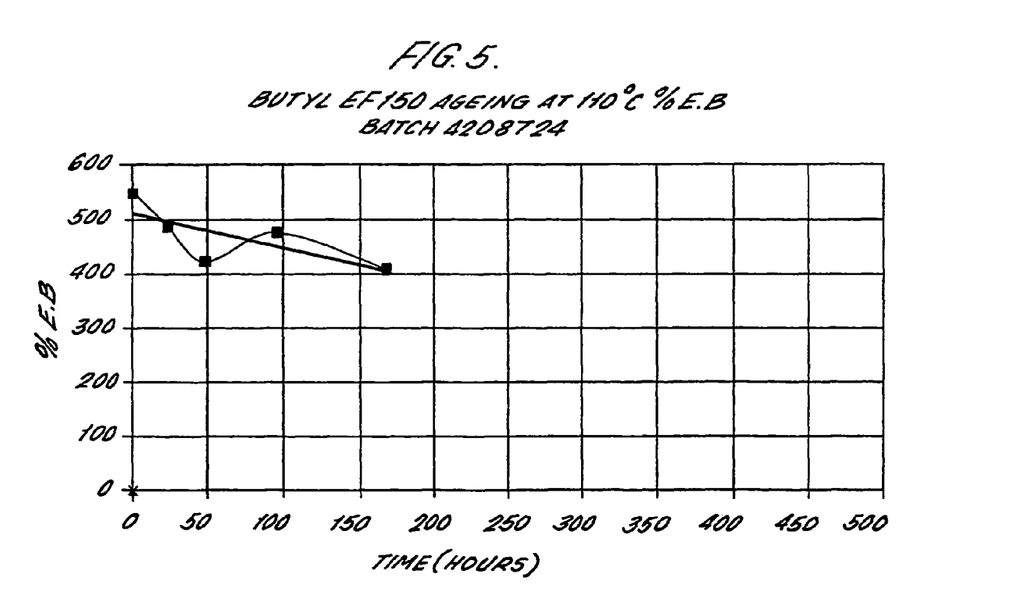
FIG. 5 is a plot of ageing (% EB against time) at 110° C. for Example EF150.
Figure 6:
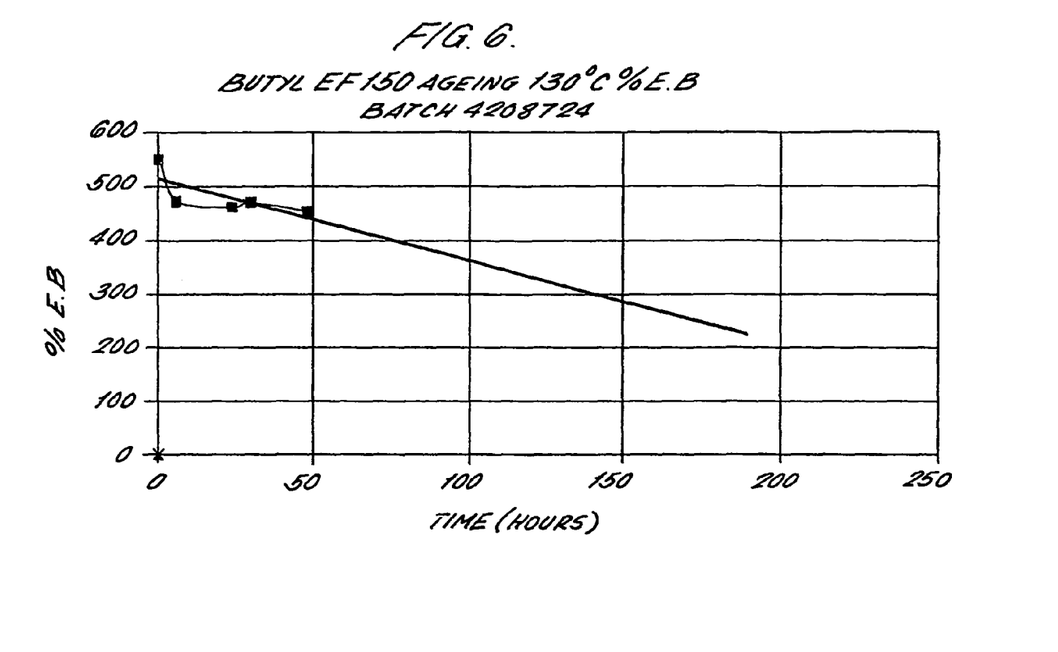
FIG. 6 is a plot of ageing (% EB against time) at 130° C. for Example EF150.
Figure 7:
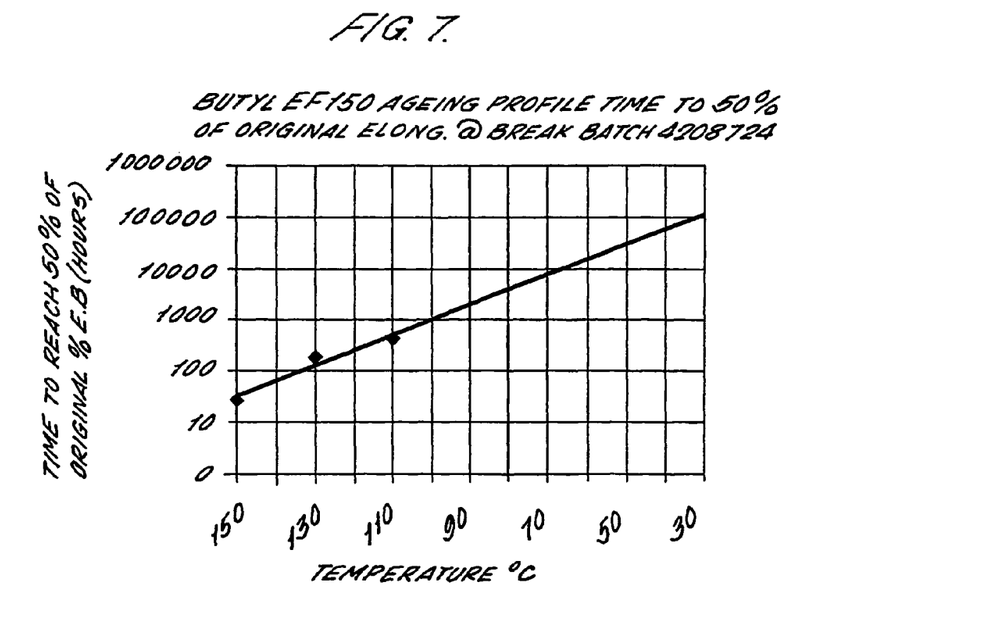
FIG. 7 shows an ageing profile of time to reach 50% of original % EB against temperature for Example EF150.

15. With reference to FIGS. 1 to 3, the formulations according to the invention show improved ageing characteristics compared with the comparative formulations.

16. With reference to FIGS. 4 to 7, the Butyl formulation EF150 shows good ageing using Robac AS100. The useful life of EF150 at 30° C. is based on the time to decay to 50% of its original elongation at break and is predicted as approximately 6.5 years. This should be taken as an approximate indication in view of the number of data points used to determine the accelerated ageing profiles.

The invention claimed is:

1. A pharmaceutical dispensing device valve seal which is a vulcanisate of an elastomeric composition comprising:
   (a) an isobutylene polymer or co-polymer thereof;
   (b) a cross-linking agent for the isobutylene polymer or co-polymer thereof, wherein the cross-linking agent is sulphur or a sulphur-donating compound, and wherein the cross-linking agent is free of peroxide curing agents; and
   (c) an accelerator for the cross-linking agent, wherein the accelerator is a polysulphide compound derived from a substituted dithiocarbonic acid or derivative thereof wherein the accelerator forms or is part of a cross-linked network of the seal and does not leach out into drug media within the device.

2. A seal as claimed in claim 1, wherein the elastomeric composition comprises one or more of polyisobutylene, polybutene, butyl rubber, halogenated butyl rubber.

3. A seal as claimed in claim 2, wherein the elastomeric composition comprises bromobutyl rubber and/or chlorobutyl rubber.

4. A seal as claimed in claim 1, wherein the elastomeric composition comprises a blend of an isobutylene polymer or co-polymer thereof and a chlorine-substituted diene polymer or co-polymer thereof.

5. A pharmaceutical dispensing device valve seal which is a vulcanisate of an elastomeric composition comprising:
   (a) a chlorine-substituted diene polymer or co-polymer thereof;
   (b) a cross-linking agent for the chlorine-substituted diene polymer or co-polymer thereof, wherein the cross-linking agent is sulphur or a sulphur-donating compound, and wherein the cross-linking agent is free of peroxide curing agents; and
   (c) an accelerator for the cross-linking agent, wherein the accelerator is a polysulphide compound derived from a substituted dithiocarbonic acid or derivative thereof wherein the accelerator forms or is part of a cross-linked network of the seal and does not leach out into drug media within the device.

6. A seal as claimed in claim 5, wherein the elastomeric composition comprises a chlorine-substituted butadiene polymer.

7. A seal as claimed in claim 6, wherein the elastomeric composition comprises 2-chlorobuta-1,3-diene.

8. A seal as claimed in claim 1, wherein said polysulphide compound is derived from a substituted xanthic acid or derivative thereof.

9. A seal as claimed in claim 1, wherein the substituted group in said polysulphide compound is an isopropyl group.

10. A seal as claimed in claim 1, wherein said polysulphide compound is diisopropyl xanthogen polysulphide.

11. A seal as claimed in claim 1, wherein said polysulphide compound comprises three or more bridging sulphur atoms.

12. A seal as claimed in claim 1, wherein said polysulphide compound is substantially free from nitrogen, phosphorus and metallic elements.

13. A seal as claimed in claim 1, wherein the elastomeric composition comprises up to 3 wt. % of the accelerator based on the total weight of the accelerator and polymer in the composition.

14. A seal as claimed in claim 13, wherein the elastomeric composition comprises up to 1.5 wt. % of the accelerator based on the total weight of the accelerator and polymer in the composition.

15. A seal as claimed in claim 1, wherein the weight ratio of the accelerator to the cross-linking agent in the elastomeric composition is in the range of from 1:1 to 3:1.

16. A seal as claimed in claim 1, wherein the seal further includes a mineral filler.

17. A seal as claimed in claim 16, wherein the mineral filler is selected from one or more of magnesium silicate, aluminum silicate, silica, titanium oxide, zinc oxide, calcium carbonate, magnesium oxide magnesium carbonate, magnesium aluminum silicate, aluminum hydroxide, talc, kaolin, clay and amino silane coated clay.

18. A seal as claimed in claim 1, wherein the seal further includes a process aid a low molecular weight polyethylene.

19. A seal as claimed in claim 1, further comprising one or more of a reinforcement agent, a plasticizer, a binder, a stabilizer, a retarder, a bonding agents, an antioxidant, a lubricant, a pigment, a wax, a resin, an antiozonants, a secondary accelerator or an activator.

20. A pharmaceutical dispensing device containing a valve having a seal as defined in claim 1.

21. A pharmaceutical dispensing device as claimed in claim 20 which is a pharmaceutical metered dose aerosol inhaler device.

22. A dispensing apparatus for dispensing pressurised fluid comprising a valve body defining a chamber, a valve member extending movably through the chamber and through at least one annular seal cooperating with the valve member and the body to regulate the discharge of fluid, wherein the at least one of the seals is as defined in claim 1.

23. A dispensing apparatus which comprises a pressurised dispensing container having a valve body provided with two annular valve seals through which a valve member is axially slidable, said seals being disposed at inlet and outlet apertures of a valve chamber so that the valve functions as a metering valve, wherein at least one of the annular valve seals is as defined in claim 1.

24. A dispensing apparatus as claimed in claim 22, comprising a pressurised dispensing container operatively connected to the valve body and containing the fluid to be dispensed and a hydrofluorocarbon propellant comprising propellant type 134a or 227.

25. A dispensing apparatus as claimed in clam 22, wherein the fluid to be dispensed comprises a liquid or particulate product as a solution or suspension in a carrier liquid comprising alcohol.

26. A dispensing apparatus as claimed in claim 25, wherein the alcohol comprises ethanol.

27. A pharmaceutical dispensing device as claimed in claim 20 which is a pharmaceutical metered dose aerosol inhaler.

28. A pharmaceutical dispensing device containing a valve having a seal as defined in claim 5.

29. A pharmaceutical dispensing device as claimed in claim 28 which is a pharmaceutical metered dose aerosol inhaler.

30. A pharmaceutical dispensing device as claimed in claim 27 and containing a hydrofluorocarbon propellant comprising propellant type 134a or 227.

31. A pharmaceutical dispensing device as claimed in claim 29 and containing a hydrofluorocarbon propellant comprising propellant type 134a or 227.

* * * * *